United States Patent [19]

Mizuhashi

[11] Patent Number: 5,023,115

[45] Date of Patent: Jun. 11, 1991

[54] METHOD OF FORMING COATINGS IN COATED TUBULAR METAL MEMBERS

[75] Inventor: Toshihiko Mizuhashi, Mishima, Japan

[73] Assignee: Usui Kokusai Sangyo Kaisha, Ltd., Japan

[21] Appl. No.: 408,024

[22] Filed: Sep. 15, 1989

[30] Foreign Application Priority Data

Sep. 17, 1988 [JP] Japan ................................ 63-233150

[51] Int. Cl.[5] .......................... B05D 3/02; B05D 1/36; B29D 22/00; B32B 1/08

[52] U.S. Cl. .................................. 427/388.2; 427/409; 428/35.8; 428/35.9

[58] Field of Search .............................. 428/35.8, 35.9; 427/388.2, 409

[56] References Cited

U.S. PATENT DOCUMENTS 4,003,760 1/1977 Labenski et al. .................... 427/409

FOREIGN PATENT DOCUMENTS 17676 2/1978 Japan .................................. 427/409

193832 8/1986 Japan ................................ 427/388.2

*Primary Examiner*—Michael Lusignan

*Assistant Examiner*—Diana L. Dudash

*Attorney, Agent, or Firm*—Armstrong, Nikaido, Marmelstein, Kubovcik & Murray

[57] ABSTRACT

A method of forming coatings in coated tubular metal members which comprises coating a fluoro resin on a chromate layer of a tubular metal member previously applied with Zn-plating having such chromate layer at the outer circumferential surface; coating a primer to the coating surface of the fluoro resin; depositing a heat shrinkable tubular member or applying a sol lining treatment of a vinyl chloride resin to the coated primer layer; forming a layer by heat shrinking the tubular member by applying heat treatment or by completely geling the sol lining, thereby tightly adhering and laminating them.

10 Claims, No Drawings

METHOD OF FORMING COATINGS IN COATED TUBULAR METAL MEMBERS

BACKGROUND OF THE INVENTION

1. Field of the Invention

The present invention concerns a method of forming coatings in coated tubular metal members having relatively small diameter of about less than 20 mm and thin wall thickness, which are generally disposed to outer portions such as floor surface as various pipelines for supplying oils and airs in automobiles and like other machineries.

2. Description of the Prior Art

Coatings in coated tubular metal members of this kind for satisfying simultaneous requirements for protection against external impact shocks given by pebbles sprung up during running and corrosion resistance together have been formed, for example, by a method of coating the outer circumferential surface of a tubular metal member applied with usual zinc plating treatment having chromate membrane directly with a tubular material such as made of a heat shrinkable vinyl chloride resin or polyolefin resin and, thereafter, applying heat treatment by passing them through a furnace to cause heat shrinking of the tubular material and thereby depositing and laminating the them.

However, in such a prior art, since the coating structure comprises a single layer of heat shrunk tubular material, the coating necessarily has a relatively large thickness of about 100 um order, to remarkably hinder the workability in the subsequent complicate bending fabrication for obtaining a final product and a further improvement is also demanded for the corrosion resistance. Further, the coating operation for the tubular material is troublesome in long tubular metal members to result in the reduction of the productivity and tending to increase the product cost. Further, the coating in the deposited and laminated state generally lacks in close bondability with the tubular metal member, thus causing gaps in the bent portion upon bending fabrication or at the coating ends due to peeling to bring about problems such as intrusion of dusts and water of rainfall and car washing.

SUMMARY OF THE INVENTION

The present invention has been accomplished in view of the foregoing problems in the prior art and the object thereof to provide a method of forming coatings capable of simultaneously satisfying the requirement for the protection against external shocks such as given by sprung pebbles and corrosion resistance together, capable of reducing the thickness of the entire coating thereby making the workability satisfactory upon subsequent bending fabrication, facilitating the coating operation as the outer layer when sol lining is applied and, further, capable of avoiding the worry of peeling at the bent portion and the end of the coating.

The foregoing object of the present invention can be attained by a method of forming coatings in coated tubular metal members, which comprises coating a fluoro resin on a chromate layer of a tubular metal member of a relatively small diameter previously applied with a zinc plating having such a chromate layer at the outer circumferential surface, with a primer resin coating as required, coating a primer to the coating surface of the fluoro resin, depositing a tubular member made of a heat shrinkable vinyl chloride resin or polyolefin resin or applying sol lining treatment with a vinyl chloride resin on the coating layer of the primer and, further, applying heat treatment in such a state thereby tightly adhering and laminating the layer of a heat shrunk tubular material or completely geled by the sol lining. In a preferred embodiment of the invention, the primer coated on the coating surface of the fluoro resin is exposed at both end portions thereof by 5 to 20 um from the coating end of the tubular material or the sol lining.

With such a method of forming coatings in accordance with the present invention, the layer prepared by heat shrunk tubular material made of vinyl chloride resin or polyolefin resin, or the layer geled by the sol lining of the vinyl chloride resin can be tightly adhered and laminated to the surface of the tubular metal member tube by way of a primer with a thickness of micronmeter order showing satisfactory close bondability with the coating layer by subsequent heat treatment at low temperature easily by providing an intermediate layer to thereby form a thin coating structure entirely. Accordingly, the workability can be maintained satisfactory even in a subsequent complicate bending fabrication, as well as protection against external shocks such as of sprung pebbles and corrosion resistance can be satisfied simultaneously, the coating operation as the outer layer can generally be simplified, and there is no worry for the peeling at the bent portion and the coating ends owing to sufficient close bondability between layers to each other and the coating can be formed at a reduced cost.

DETAILED DESCRIPTION OF THE INVENTION

Referring specifically to the present invention, a tubular metal member is prepared by applying zinc plating having a chromate membrane by means of a usual plating method to the outer circumferential surface of a tubular body comprising a thin-walled single or a double-wound layer having a copper plating layer to the circumferential surface thereof in view of the tubular making having a pipe outer diameter of less than 20 mm and a wall thickness of from 0.7 to 2.0 mm. Then, a fluoro resin is coated on the chromate membrane of the tubular metal member by means of usual spraying or brushing coating with or without coating primer on the chromate membrane. Then, a primer of excellent corrosion resistance of micronmeter order thickness is coated to the coating surface of a fluoro resin also by the same method as described above.

Then, on the thus formed primer coating layer, a tubular member made of a heat shrinkable vinyl chloride resin or polyolefin resin is deposited and applied with heat treatment at a temperature of about 100° C., or sol lining with a vinyl chloride resin is applied, followed by heat treatment at a temperature range from 150° to 350° C., by which the layer formed by heat shrinking of the tubular member or the complete geling of the sol lining is tightly adhered and laminated.

Upon forming the layer by the sol lining, the tubular metal member is dipped in a sol bath at a viscosity of 1000 to 5000 cp while being rotated and preheated, or sol was coated by an airless spray while rotating and preheating the tubular metal member in the same manner and baked in an atmosphere from 150° C. to 300 ° C. for from several tens seconds to several minutes.

The primer coated on the coating surface of the fluoro resin is preferably exposed as an outer layer at the both end portions thereof by 5 to 22 from the coating ends of the tubular member or sol lining. That is, since the bodability is poor between the end portion of the primer and the coating membrane of the tubular member or sol lining, they tend to cause "sag" in which the thickness of the primer is locally increased and a hard primer with a pencil hardness of 5H suffers from crack if it is hit by a sprung pebble or applied with bending fabrication to cause gaps relative to the layer of the tubular member or the sol lining. If the end of the layer formed with the tubular member or sol lining and the end of the primer are placed at an identical position, the corrosive dusts or fluids invading through the cracks or gaps are hindered from escaping externally by the layers of the tubular member or the sol lining, but chemically attack the coating layer of the fluoro resin to give undesired effect on the layer with the tubular member or the sol lining during long time use.

In the present invention, since both end portions of the primer are exposed by 5 to 20 mm from the ends of the layers formed with the tubular member or sol lining, and the primer is made as the outer layer in these portions, if cracks should occur owing to the "sag", they give no undesired effects on the coating layer of the fluoro resin or the layer with the tubular member or the sol lining since corrosive dust or fluid are externally falled, etc.

The reason why they are exposed by 5–20 mm is that cracks may possibly be caused as far as the inside of the layer with the tubular member or the sol lining if they are less than 5 mm. On the contrary, if they are exposed in excess of 20 mm, they do not reach the inside of the layer with the tubular member or sol lining and, accordingly, it is not necessary to expose them in excess of 20 mm, which will merely lead to wasteful use of material.

As has been described above, since the method of forming coatings in coated tubular metal members comprises applying a coating treatment of a fluoro resin as an intermediate layer, coating a primer of excellent corrosion resistance with a thickness of micronmeter order to the surface thereof, then depositing a tubular member made of a heat shrinkable vinyl chloride resin or polyolefin resin on the coating membrane of the primer, or applying sol lining of a vinyl chloride resin and followed by heat treatment, thereby tightly closing and laminating the layer of the vinyl chloride resin formed by the heat shrinking of the tubular member or complete geling of the sol lining, the entire thickness of the coating can be made relatively reduced and, accordingly, the workability can be maintained satisfactory even in the subsequent complicate bending fabrication, requirement for the protection against external shocks such as given by sprung pebbles and corrosion resistance can be satisfied altogether. Further, in the case of applying sol lining, the coating operation as the outer layer is generally simple and convenient and, further, there is no worry for the peeling at the bent portion and the coating ends and, accordingly, it can provide extremely useful coating-formation method capable of preventing intrusion of dusts, water of rainfall, car washing etc.

What is claimed is:

1. A method of forming coatings on coated tubular metal members which comprises the steps of:
   - coating a fluoro resin on a chromate layer on a tubular metal member previously applied with Zn-plating having such a chromate layer at the outer circumferential surface;
   - coating a primer on the surface of said fluoro resin;
   - depositing a heat shrinkable tubular, resin member onto said coated primer layer; and
   - then heat shrinking said tubular member by applying a heat treatment, thereby tightly adhering and laminating the various layers.

2. A method as defined in claim 1, including applying a primer between the chromate membrane and the fluoro resin coating layer.

3. A method as defined in claim 1, wherein said tubular member is coated on said coated primer layer such as to expose about 5–20 mm of said primer layer from the end thereof.

4. A method as defined in claim 1, wherein the tubular metal member has an outer diameter of less than 20 mm and a wall thickness of from 0.7 to 2.0 mm.

5. A method as defined in claim 1, wherein the heat shrinkable tubular member is made of a vinyl chloride resin or a polyolefin resin.

6. A method of forming coatings on coated tubular metal members which comprises the steps of:
   - coating a fluoro resin on a chromate layer on a tubular metal member previously applied with Zn-plating having such a chromate layer at the outer circumferential surface;
   - coating a primer on the surface of said fluoro resin;
   - depositing a solution of vinyl chloride resin onto said coated primer layer, and
   - then completely gelling said solution, sufficient to form such into a layer, therby tightly adhering and laminating such to said coated primer layer.

7. A method as defined in claim 6, wherein the layer with the sol lining is formed by dipping said tubular metal member in a bath of said solution having a viscosity of 1000 to 5000 cp while rotating and heating said member and, thereafter, baking such at about 150° to 300° C. for a time of from several tens of seconds to several minutes.

8. A method as defined in claim 6, wherein the layer with the sol lining is coated by means of an airless spray while rotating and preheating the tubular metal member and, thereafter, baked at about 150° to 300° C. for a time of from several tens of seconds to several minutes.

9. A method as defined in claim 6, including applying a primer between the chromate membrane and the fluoro resin coating layer.

10. A method as claimed in claim 6, wherein said solution is deposited on said coated primer layer such that about 5 to 20 mm. of the primer layer is left exposed.

* * * * *